United States Patent [19]  
Montgomery

[11] Patent Number: 4,983,340  
[45] Date of Patent: Jan. 8, 1991

[54] METHOD FOR FORMING A HIGH DENSITY METAL BORIDE COMPOSITE

[75] Inventor: Lionel C. Montgomery, Bay Village, Ohio

[73] Assignee: Union Carbide Coatings Service Technology Corporation, Danbury, Conn.

[21] Appl. No.: 458,347

[22] Filed: Dec. 28, 1989

[51] Int. Cl.$^5$ .............................................. C04B 35/64
[52] U.S. Cl. ........................................ 264/63; 264/60; 264/61; 264/126; 264/67; 501/96
[58] Field of Search ...................... 264/60, 61, 63, 126, 264/67; 501/96, 3-10 C, 17

[56] References Cited

U.S. PATENT DOCUMENTS

| | | | |
|---|---|---|---|
| 3,376,247 | 4/1968 | Reddy et al. | 524/365 |
| 3,544,486 | 12/1970 | Passmore | 501/96 |
| 4,029,000 | 6/1977 | Nakamura et al. | 501/96 X |
| 4,108,670 | 8/1978 | Steiger et al. | 501/96 |
| 4,246,027 | 1/1981 | Watanabe et al. | 75/244 |
| 4,275,025 | 6/1981 | May, Jr. | 264/63 |
| 4,275,026 | 6/1981 | Hazel et al. | 501/96 X |
| 4,514,355 | 4/1985 | Montgomery | 264/332 |
| 4,526,669 | 7/1985 | Joó et al. | 204/243 R |
| 4,592,882 | 6/1986 | Danish | 264/66 |
| 4,636,481 | 1/1987 | Kida et al. | 501/96 |
| 4,642,298 | 2/1987 | Kuramoto et al. | 501/96 |

Primary Examiner—Stephen J. Lechert, Jr.  
Assistant Examiner—Ngollan T. Mai  
Attorney, Agent, or Firm—E. Lieberstein

[57] ABSTRACT

A method for forming a dense metal boride composite article having a predetermined shape in which the method comprises blending a metal boride and a nitride to form a mixture of particles, milling the particles to a desired size, coating the particles with a lubricant formed from a polyvinyl acetate, cold forming the particles into an article of desired shape and pressureless sintering the cold formed article.

7 Claims, No Drawings

METHOD FOR FORMING A HIGH DENSITY METAL BORIDE COMPOSITE

FIELD OF THE INVENTION

The invention relates to a method of forming a shaped high density body of a composite of metal boride and a nitride and more particularly to a method of forming a high density shaped body of a metal boride composite article without the need for hot pressing and machining.

BACKGROUND OF THE INVENTION

Shaped articles of titanium diboride are conventionally used in the manufacture of refractory containers for use in the electrolytic reduction of aluminum. To control the electrical resisticity of the refractory a composite of $TiB_2$ and BN is formed by blending each in a controlled ratio. The blend is then hot pressed into a billet from which the shaped article is formed. For example, a boat blank, useful as a container to vaporize aluminum, is formed by diamond machining and grinding a cavity from a $TiB_2$:BN billet. The entire operation is very labor intensive and also very costly particularly the equipment for perform the fabrication and machining operation, its maintenance and the loss of billet stock due to sawing and grinding.

SUMMARY OF THE INVENTION

It has been discovered in accordance with the present invention that a metal boride composite of a Group IVb metal boride and AlN under the proper process conditions can be cold formed into a desired shape and pressureless-sintered to a density, near theoretical, without the need for hot pressing and machining.

The process of the present invention for forming a dense metal boride composite article of predetermined shape comprises:

blending a boride of metal from Group IVb of the periodic table with AlN to form a blended mixture in a desired proportion corresponding to the desired electrical resistivity for the composite article;

grinding the blended mixture to particles of predetermined size;

coating the particles with a lubricant of a resinous material formed from vinyl chloride and acetate;

cold forming the particles into an article of desired shape; and pressureless sintering the cold formed article under an inert atmosphere to produce a high density article of substantially near theoretical density.

DESCRIPTION OF THE PREFERRED EMBODIMENT

A refractory metal boride composite of a metal boride and an aluminum nitride is cold formed in accordance with the present invention into a preformed shaped article with a density of 95-98% of theoretical by means of cold pressing and sintering. Because the sintering operation takes place at high temperatures grain growth occurs in both the metal boride and in the AlN powder. The boride is formed from a metal in Group IVb of the periodic table which includes titanium, zirconium and hafnium. The electrical resistivity of the composite article is determined by the ratio of metal boride or diboride to aluminum nitride. The aluminum nitride acts equally as well as the metal diboride in resisting corrosion during vaporization. Moreover, the presence of AlN results in a structure that is much stronger at the vaporization temperature of most metals than a similar refractory composite containing BN.

A grain growth inhibitor such as $CrB_2$ preferably between 1-5% by weight, optionally 3%, is added to the powder blend to reduce the grain growth. The $CrB_2$ enters into solid solution with the metal boride composite to inhibit grain growth by decreasing the mobility of the grain boundaries.

To prepare the powders for cold pressing, the powders of metal boride, AlN and $CrB_2$ are blended and dry attritored preferably using a tungsten carbide and cobalt grind media. It may also be desirable to include a small percentage of BN in the powder composition up to a maximum of 20% by volume. The milling operation reduces the average particle size of the powered blend to an average size of about 3-5 microns and allows for trace quantities of Fe, Ni, Co and W equivalent to about 0.5 volume % to be picked up into the blended mixture. These metals function as sintering and densification aids and are cold welded to the $TiB_2$:AlN powders during attritoring to produce a physically stable powder system.

The attritored powders are then prepared for cold-forming by coating the particles with a lubricant of a resin of vinyl chloride and vinyl acetate, preferably as polyvinyl acetate, to produce a well lubricated granulated powder system preferably with an agglomerated size of $-65$ to $+325$ mesh. The lubricant may be sprayed on the particles and milled to produce the granulated powder system or ball milled in a liquid powder slurry suspension containing the lubricant and crushed into the desired agglomerated size.

The polyvinyl acetate resin should be suspended in an organic solvent preferably an organic keytone to form a liquid slurry. The preferred organic ketone is methylethyl-ketone (MEK).

The agglomerated powder system is then cold-formed into a shaped article by cold pressing at high pressure such as 35000 psi in well lubricated metal dies or by slip casting or by isostatic molding.

The cold formed article has a high green density of between 60-65% of theoretical which is substantially uniform throughout the volume of the shaped article. If desired the formed shapes can be cured at a relatively low temperature of for example 150° C., to increase the strength of the green structure so as to permit subsequent machining operations.

Because the cold formed shapes substantially shrink during sintering it is necessary to avoid distortion by uniformly heating the cold formed shape within a freely movable environment. Accordingly, the green shape should be enclosed, but not confined, in a box or container of graphite or flexible graphite to permit the article to freely expand or shrink during the heat cycle. The pressureless sintering atmosphere should be inert preferably in an argon atomsphere or in a vacuum. The sintering operation can be done either in a batch or continuous furnace.

For added support, and to permit sintering a powder pack system can be used to surround the cold formed shape. For example, cold formed blanks of $TiB_2+50$ AlN can be packed in a graphite box with a powder of the same composition and then pressureless sintered. The graphite boxes may be heated at a controlled rate up to about 1900° C. and for a fixed period of time of for example two hours.

The cold formed stock can also be presintered at a temperature below the maximum sintering temperature to cause essentially all the distortion and a substantial percentage of the shrinkage to occur before final sintering. The stock can be machined to remove the distortion and then final sintered to produce pressureless-sintered shapes free of distortion.

A desired metal diboride can be formed stoichiometricaly by a continuous carbon reduction process as follows:

$$TiO_2 + B_2O_3 + 5C \rightarrow TiB_2 + 5CO \uparrow$$

A similar reaction may be used to form a substitute diboride such as $ZrB_2$.

What I claim is:

1. A process for forming a dense metal boride composite article of predetermined shape comprising the steps of:
   blending a boride of a metal from Group IVb of the periodic table with a nitride to form a blended mixture in a desired proportion corresponding to the desired electrical resistivity for composite article;
   grinding the blended mixture to particles having a predetermined average size of between about 3–5 microns;
   coating the particles with a lubricant of a resinous material formed from a composition of vinyl chloride and vinyl acetate dissolved in an organic resin;
   cold forming the particles into an article of desired shape; and
   pressureless sintering the cold formed article under an inert atmosphere or vacuum to produce a high density article of substantially near theoretical density.

2. A process as claimed in claim 1 wherein said organic resin is methylethyl-ketone.

3. A process as defined in claim 2 wherein said nitride is aluminum nitride.

4. A process as defined in claim 3 wherein said metal boride is a diboride of a metal selected from the group consisting of titanium, zirconium and hafnium.

5. A process as defined in claim 4 wherein said nitride includes particles of boron nitride up to a maximum of 20% by volume.

6. A process as defined in claim 5 further comprising $CrB_2$ of between 1–5% by weight.

7. A process as defined in claim 6 wherein said cold formed article is enclosed in a flexible graphite container prior to pressureless sintering.

* * * * *